United States Patent [19]

Stanev

[11] 4,015,675
[45] Apr. 5, 1977

[54] METHOD OF MEASURING A RAILWAY-VEHICLE LOAD

[75] Inventor: Tzvyatko Penchev Stanev, Sofia, Bulgaria

[73] Assignee: DSO "Bulgarski Darjavni Jeleznitzi", Sofia, Bulgaria

[22] Filed: Apr. 3, 1975

[21] Appl. No.: 564,664

Related U.S. Application Data

[62] Division of Ser. No. 388,888, Aug. 16, 1973, Pat. No. 3,887,002.

[52] U.S. Cl. .................................. 177/1; 177/163; 177/229
[51] Int. Cl.² .......................................... G01G 3/00
[58] Field of Search ............. 177/146, 1, 163, 225, 177/229; 73/141 A

[56] References Cited

UNITED STATES PATENTS

| | | | |
|---|---|---|---|
| 1,012,632 | 12/1911 | Groome | 177/146 |
| 1,536,715 | 5/1925 | Huckel | 177/146 |
| 1,913,915 | 6/1933 | Broscombe | 177/146 X |

FOREIGN PATENTS OR APPLICATIONS

| | | | |
|---|---|---|---|
| 519,619 | 6/1921 | France | 177/146 |

Primary Examiner—Joseph W. Hartary
Attorney, Agent, or Firm—Karl F. Ross; Herbert Dubno

[57] ABSTRACT

The load of a railroad car is measured by placing the base of a measuring device upon the flange of a track along which the railroad car is displaceable. The lower leg of a U-shaped member is lifted to bring the upper leg of this member into engagement with the vehicle wheel. A lever is fulcrumed on the lower leg and has one side biased by the free upper arm while the other side acts upon a meter displaying the load.

1 Claim, 4 Drawing Figures

METHOD OF MEASURING A RAILWAY-VEHICLE LOAD

CROSS-REFERENCE TO RELATED APPLICATION

The present application is a division of Ser. No. 388,888 filed Aug. 16, 1973, now U.S. Pat. No. 3,887,002.

FIELD OF THE INVENTION

The present invention relates to a method of measuring the load applied by the wheel of a railroad vehicle to a track.

BACKGROUND OF THE INVENTION

The load upon a railroad vehicle wheel or applied thereby to a track has been measured heretofore by special equipment mounted below the vehicle and having a number of devices corresponding to the number of wheels of the railroad car. Such equipment is expensive and occupies considerable space and is not adaptable for use with vehicles having different wheel bases.

In another system, a hydraulic device provided with a pressure gauge is located beneath the axle box of the vehicle and is operated to lift the vehicle wheels from the track. The gauge, responsive to hydraulic pressure, can read the load which can then be calculated in terms of the loads on the opposite wheels of a given axle to provide the measurement. This system has been found to be subject to low sensitivity and error and has the disadvantage that rigid supports must be provided under the axle boxes under the vehicle.

OBJECT OF THE INVENTION

It is the object of the present invention to obviate the aforementioned disadvantages.

SUMMARY OF THE INVENTION

This object is achieved by the lifting of a wheel with a deformable sensing element whose deflection is measured by a dial indicator. The reading of the latter at the moment of disengagement of the wheel from the track, evident from the termination of further acceleration of the needle, provides the measurement.

The measuring instrument comprises an elastically deformable U-shaped shackle of spring steel and a bushing fixed to the lower arm of this shackle and receiving an eccentric portion of a crankshaft. The crankshaft has a portion which presses a support against the lower flange or foot of the rail and is provided with a manually displaceable lever for rotating the crankshaft. A measuring lever fulcrumed on the bushing is responsive to the deflection of the free upper arm of the shackle which rests against the wheel, and acts upon a dial indicator carried by the shackle.

SPECIFIC DESCRIPTION

Figure 1:
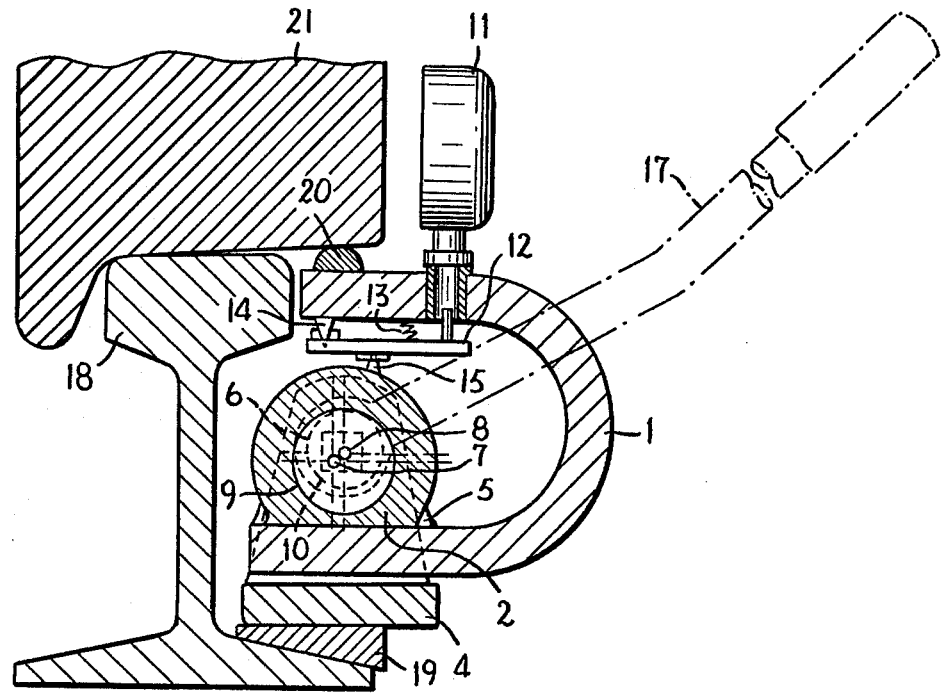
FIG. 1 is a vertical cross-section through the device used in the practice of the method of the present invention.
Figure 2:
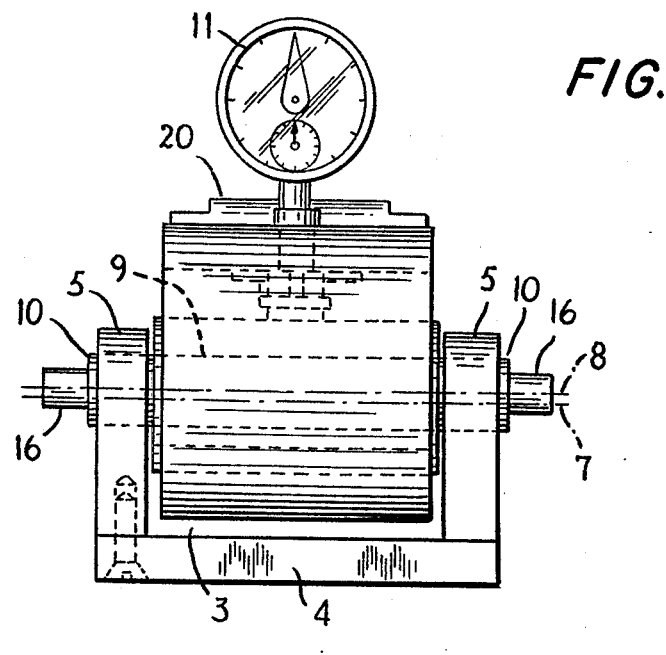
FIG. 2 is a side-elevational view thereof.
Figure 3:
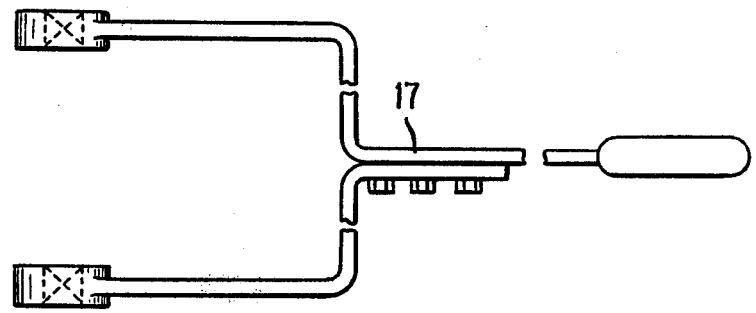
FIG. 3 is a top view of the operating lever of the device.

In FIGS. 1 - 3 I show a deformable shackle 1 of U-configuration, having a lower arm which is provided with a bushing 2 and disposed above a base 4 whose trunions rotatably support a crankshaft 6. The middle section 9 of the crankshaft has a center 7 which is offset from the center 8 of a pair of square-end pins which may be received in the square holds of a lever 17 shown in solid lines in FIG. 3 but in dot-dash lines in FIG. 1.

The bearings 10 support the shaft 6 rotatably. The measuring unit comprises a rocker arm 12 resting upon a knife-edge fulcrum 15 of the bushing 2 and engaged by a knife edge 14 on a free end of the upper arm of the shackle 1. A spring 13 urges the rocker arm 12 into constant engagement with the knife edges 14 and 15. The other end of the rocker arm 12 is engaged by a pin of a compression-force gauge 11. A supporting edge 20 is provided on the upper side of the upper arm of shackle 1 to engage the vehicle wheel.

The device shown in FIGS. 1–3 is mounted on the foot or lower flange of a rail 18 below the wheel 21 so that the base 4 of the support 3 lies on the rail foot or is in force-transmitting relation therewith through a plate 19. The edge 20 is positioned below the wheel.

Figure 4:
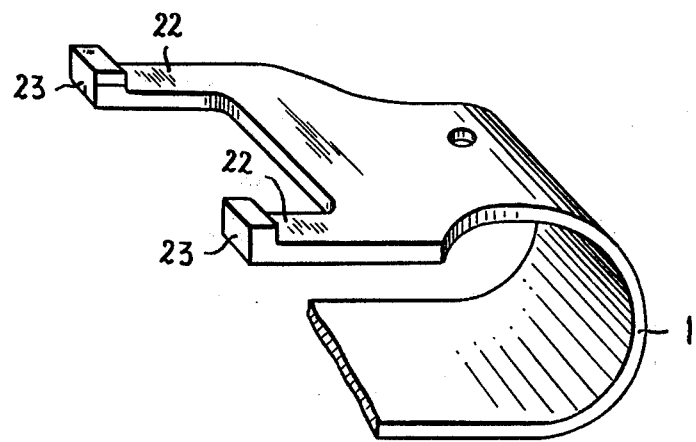
FIG. 4 is an axonometric view of a portion of the shackle according to the invention.

The arm 17 is then rotated to raise the bushing 2 and the shackle 1 until the wheel is lifted from the track. During this movement, the arms of the shackle 1 are deflected toward one another and the rocker arm 12 is rotated in the counterclockwise sense (FIG. 1) about the fulcrum 15 and the reading of the gauge 11 increases until the wheel has been lifted from the track. At this moment the load corresponds to the gauge reading.

Where it is necessary for precision that the measuring arm enter the rolling circle of the vehicle, the shackle has the bifurcated arrangement shown in FIG. 4 in which the legs 22 pass over the rail 18 and beneath the wheel. The lugs 23 engage at the rolling circle.

I claim:

1. A method of measuring the load of a railway vehicle wheel for a railway vehicle on a track which comprises the steps of:
   a. disposing between said track and a wheel of the vehicle a U-shaped shackle having a lower arm and an upper arm;
   b. lifting said lower arm while said upper arm bears against said wheel, thereby causing said arms to deflect toward one another; and
   c. registering the relative deflection of said arms toward one another on a dial guage whereby the deflection of said arms registered on said gauge at the instant said wheel is lifted from said track represents the wheel load.

* * * * *